United States Patent

Werner

[15] 3,687,404
[45] Aug. 29, 1972

[54] AUTOMOBILE ENGINE MOUNTING AND METHOD

[72] Inventor: Lawrence E. Werner, Grosse Pointe, Mich.

[73] Assignee: Cheysler Corporation, Highland Park, Mich.

[22] Filed: Dec. 15, 1969

[21] Appl. No.: 884,857

[52] U.S. Cl. ..........................248/7, 248/15, 287/85
[51] Int. Cl. ..............................................F16j 13/00
[58] Field of Search ..287/85; 285/23; 151/69; 248/7, 248/9, 10, 15, 18, 22, 26, 358

[56] References Cited

UNITED STATES PATENTS

| 3,556,445 | 1/1971 | Werner | 248/7 |
| 1,940,302 | 12/1933 | Humphrey et al. | 287/85 X |
| 2,422,327 | 6/1947 | Winslow | 287/85 X |
| 2,829,696 | 4/1958 | Wagner | 151/69 |
| 3,368,852 | 2/1968 | Herbenar et al. | 287/85 X |

*Primary Examiner*—William H. Schultz
*Attorney*—Harness, Talburtt and Baldwin

[57] ABSTRACT

A resilient bushing assembly comprises inner and outer tubular members spaced by an elastic bushing under sufficient pressure to extrude a yieldable detent portion thereof through a radial opening in the inner member and into a detent receiving groove of a bolt located at a detent position within the inner member. The ends of the bolt extend axially beyond the bushing assembly to ride within a pair of guide slots in a corresponding pair of brackets and to seat in supported and predetermined located relationship at the slot bases. A bolt head and nut oversize with respect to the slots and spaced axially outwardly of the brackets at opposite ends of the bolt enable assembly of the bushing assembly and bolt at the detent position by movement of the bolt to its seated position through open ends of the slots whereupon the nut is tightened to draw the bolt from the detent position to clamp the bushing assembly between the brackets. Axial movement limiting flanges of the brackets overlie the bolt head and nut at the tightened position, but freely clear the flanges axially outwardly thereof during assembly when the bolt is at the detent position.

11 Claims, 5 Drawing Figures

Patented Aug. 29, 1972 3,687,404

INVENTOR.
Lawrence E. Werner
BY
Harness, Talbutt & Baldwin
ATTORNEYS.

Patented Aug. 29, 1972
3,687,404
2 Sheets-Sheet 2
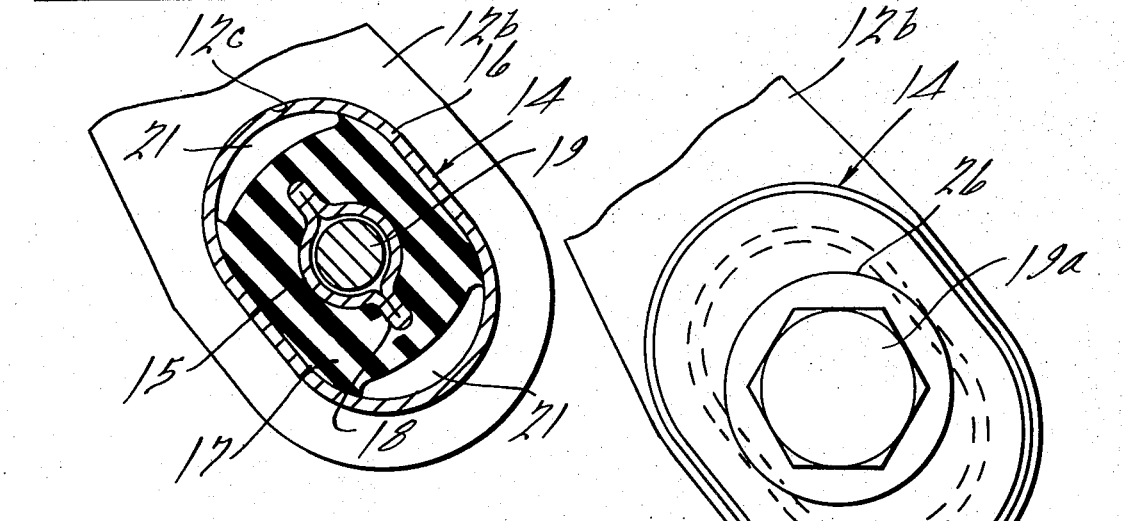
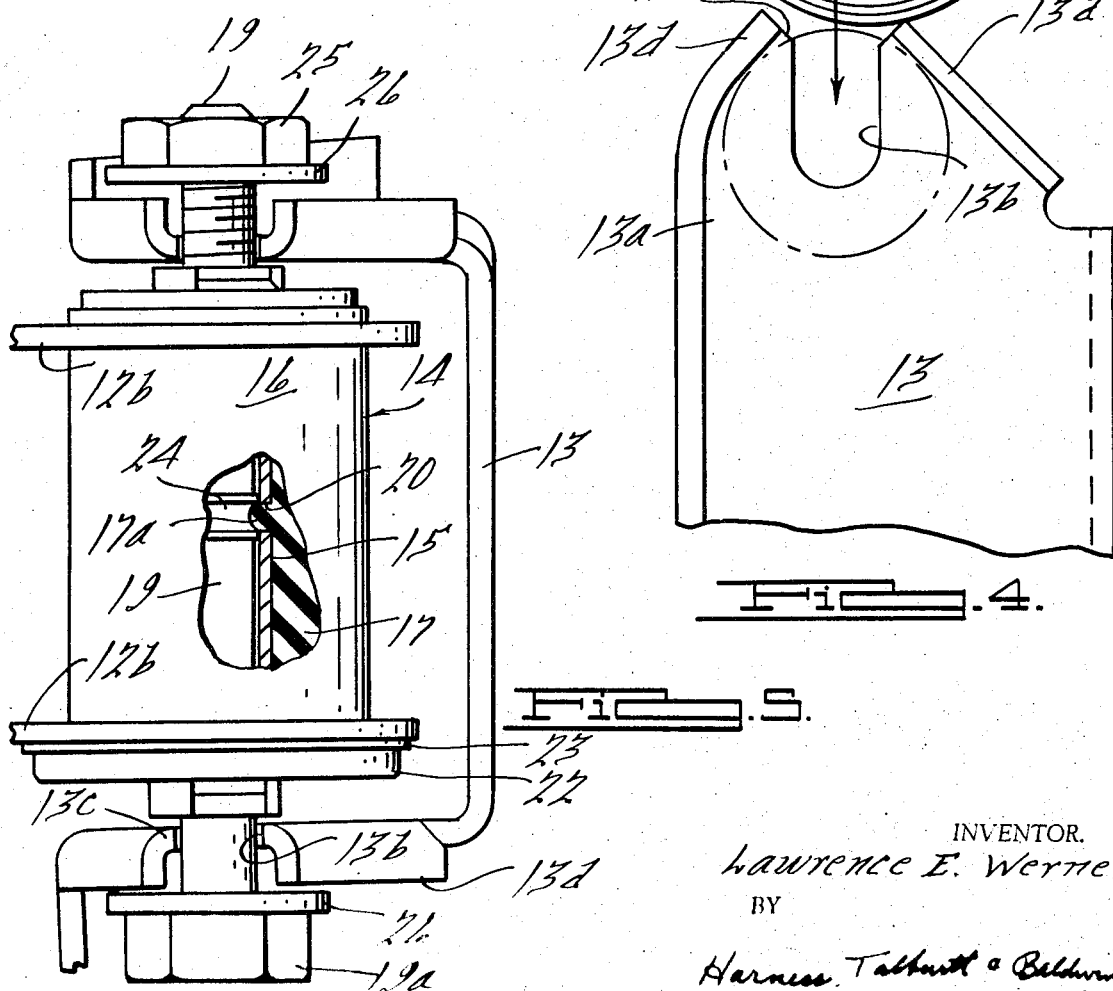
INVENTOR.
Lawrence E. Werner
BY
Harness, Talburtt & Baldwin
ATTORNEYS.

3,687,404

AUTOMOBILE ENGINE MOUNTING AND METHOD

CROSS REFERENCE TO RELATED APPLICATION

This application is concerned with improvements over my copending application Ser. No. 860720 filed Sept. 24, 1969, now U.S. Pat. No. 3,556,445, Jan. 19, 1971.

BACKGROUND AND SUMMARY OF THE INVENTION

This invention relates to an improved vibration damping mounting structure and method for mounting an automobile engine on a vehicle body and has for an important object the provision of an engine mounting which is particularly simple and economical in structure and application and which utilizes a voided bushing to optimum advantage to obtain a fail safe structure in the event of bushing deterioration, to facilitate tuning and vibration isolation to accommodate engine modifications, to provide a positive resilient engine support for limiting all components of engine movements, and in particular to reduce engine roll significantly to approximately one-third of former requirements for comparable engine mountings without sacrificing vibration absorbing qualities.

Other and more specific objects are to provide such a bushing assembly comprising inner and outer tubular members spaced by an intermediate elastic bushing of rubberlike material. The outer tubular member is forced into axially spaced aligned openings within a pair of engine brackets adapted to be secured in predetermined fixed position to one side of the engine with the axes of the tubular members extending longitudinally of the automobile body. The outer tubular member is out-of-round and preferably of oval cross section conforming to the shape of the aligned bracket openings and dimensioned to effect an interference fit therein at its axially opposite ends, whereby relative rotation between the bushing assembly and engine brackets is prevented.

Another object of the instance invention is to facilitate mounting of the automobile engine on the body. By guiding the bolts to the bases of guide slots in fixed brackets on the body, a heavy engine that cannot be readily handled without the aid of a mechanical hoist may be quickly and accurately dropped into the preassembled position and properly located on the body. The assembly is completed merely by tightening clamping means, which may simply comprise an enlarged head integral with one end of the bolt and an enlarged nut screwed on the other end. Detent means comprising a resilient detent projection of each elastic bushing registering in an annular detent groove within the associated bolt releasably holds the latter at a preassembled detent position within its inner tubular member, whereat the bolt head and nut are spaced outwardly of the fixed brackets to freely clear the same and enable downward movement of the bolt within the guide slots upon lowering of the engine.

The mounting described is particularly suitable for use as a front engine mounting, such that similar mountings are employed at opposite forward side portions of the engine with the bolts extending generally longitudinally of the vehicle body. The elastic bushing of each assembly is forced into the associated outer tubular member to compress the bushing in the direction of the shorter dimension of the oval cross section, and is provided with diametrically spaced axially extending voids within the larger cross sectional dimension. In this regard the resilient detent projection comprises a portion of the compressed elastic bushing extruding radially through an opening in the sidewall of the inner tubular member. When the nut is tightened to the final clamping position, the bolt is forced axially relative to the detent projection, causing the latter to yield from its detent position within the detent groove.

Other objects of this invention will appear in the following description and appended claims, reference being had to the accompanying drawings forming a part of this specification wherein like reference characters designate corresponding parts in the several views.

FIG. 3 is a transverse sectional view through the bushing assembly, taken in the direction of the arrows substantially along the line 3—3 of FIG. 2.

FIG. 4 is a fragmentary front elevational view showing the relationship between the engine and body brackets prior to assembly.

FIG. 5 is a plan view of the structure illustrated in FIG. 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
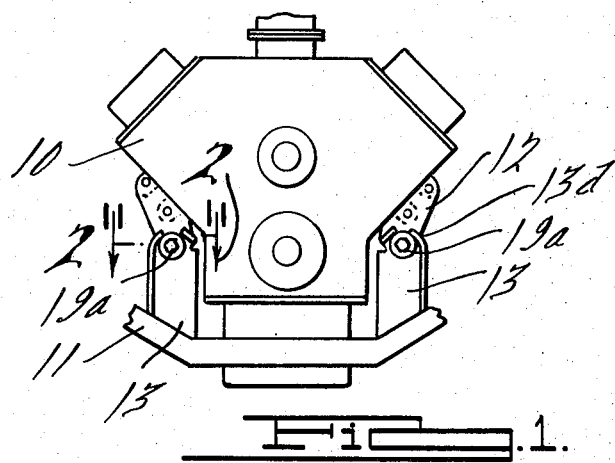
FIG. 1 is a schematic front elevational view of an engine mounted on a portion of an automobile body in accordance with the present invention.

Referring to the drawings, an automobile engine 10 is schematically illustrated in FIG. 1 mounted on a body cross member 11 of a vehicle by means of an engine bracket 12 and body bracket 13 interconnected by a voided bushing assembly 14 at opposite sides of the engine. The brackets 12 and 13 are each one-piece steel channel structures described in more detail below, the engine bracket 12 providing means for adjustable attachment to the engine 10, as for example by bolts. The bracket 13 is likewise suitably secured to the body member 11 in a predetermined position of alignment, as for example by bolts or by welding.

Each bushing assembly 14 comprises inner and outer steel tubular members 15 and 16 respectively spaced by an elastic bushing 17 of rubber-like material. The inner tubular member 15 comprises a tube flattened at diametrically opposite sides 18 to provide greater shear resistance within the bushing 17, has a central axially extending circular opening for the shank of a bolt 19 of a screw threaded clamping means, and a pair of diametrically spaced radial openings 20 in its sidewall into which a detent projection 17a of the bushing 17 extends. The inner tubular member 15 is suitably bonded to the bushing 17 and may comprise an insert within the molded bushing 17 or may be forced therein after the bushing is molded.

The outer tubular shell or member 16 has an oval cross section enlarged in the direction of the flats 18 and is also bonded to the bushing 17 forced therein. In this regard, a thermosetting bonding resin may be applied to the parts to lubricate and facilitate insertion of the bushing 17 under compression into the confines of the outer shell 16. Thereafter the resin is cured to effect the bond. Each bushing 17 is compressed in its short radial direction and is relieved in the long radial direction of the flats 18 to provide axially extending voids 21. In the present instance each bushing 17 is provided with an integral annular locating flange 22 at one end which abuts a similar locating flange 23 of the member 16 to facilitate assembly of these members when they are forced together.

Each of the engine brackets 12 has a pair of axially spaced channel sides 12b containing a pair of aligned oval openings 12c respectively conforming closely to the outer contour of the member 16 therein to effect an interference fit therewith and to receive the latter when pressed therein, thereby to prevent relative rotation of the bushing assembly 14 within the bracket 12. If desired, the assembled member 16 and bracket channel sides 12b may be further secured against disassembly, as for example by staking.

The opposite channel sides or bracket arms 13a of each body bracket 13 are provided with a pair of upwardly opening guide slots 13b respectively adapted to receive the opposite ends of one of the bolts 19 therein. The openings of the slots 13b are chamfered at 13c to facilitate downward guided movement of the bolt 19. Each channel arm 13a adjacent opposite sides of the opening of its slot 13b is flanged axially outwardly at 13d. The bolt 19 is provided with an annular detent groove 24 rolled into its periphery at a predetermined location with respect to the opening 20 to receive the detent projection 17a during assembly as described below. The pair of annular beads 24a spaced by the groove 24 and resulting from the rolling operation by which the latter is formed increase its effective depth. The bolt 19 is also formed with a conventional integral hexagonal bolt head 19a at one end and is threaded at its opposite end to receive a nut 25. A pair of steel washers 26 oversize with respect to the associated slots 13b are provided integrally with the bolt head 19a and nut 25 respectively.

After the brackets 12 and 13 are properly secured to the engine 10 and body 11 in their desired fixed positions, with the associated channel sides or elements 12b and 13a spaced axially, or longitudinally of the vehicle body, and with a bushing assembly 14 pressed into and suitably retained within the mating oval holes 12c in each pair of channel sides 12b, a bolt 19 is inserted axially through each of the inner tubular members 15 until the elastic detent projection 17a engages within the detent groove 24. Although the projection 17a is releasable from the groove 24 upon the application of sufficient axial force to the bolt 19, the pressurized material of the bushing 17 at 17a will effect a definite detent action to enable the operator to determine by feel when the bolt is properly located at its detent position, FIG. 5.

A nut 25 with its integral washer 26 is then loosely screwed on the threaded end of each bolt 19, which at the detent position is located axially within its member 15 so that the nut 25 and bolt head 19a with their respective integral washers 26 will freely clear the flanges 13d, FIG. 4, when the engine 10 is lowered into position, as for example by means of a mechanical hoist. In this regard the bolt 19 fits closely within the member 15 to avoid play therein and is retained at the detent position by the interengagement between the projection 17a and groove 24 in the event the bolt should accidentally strike one of the bracket arms 13a during assembly, for example, or the engine 10 is tilted.

As the engine 10 is lowered, the opposite ends of the bolts 19 are guided into the chamfered openings 13c and downwardly within the corresponding slots 13b to a preassembled position supported on the bases of the slots. The engine will be thus located by the bolts 19 supported on the bases of the slots 13b, whereupon the nuts 25 are tightened to draw the bolts 19 axially from their detent positions and clamp the washers 26 against the adjacent channel arms 13a, FIG. 2, thereby to stress the latter tightly in a positive clamping action against the bushing assembly 14. By inserting the bolts 19 to the detent positions within the inner members 15 prior to lowering the engine to its partially assembled position, no further adjustment or positioning of the engine is required at the latter position (except for tightening the nuts 25) and all problems relating to aligning and locating the brackets 12 and 13 with respect to each other, as for example to enable insertion of bolts 19 through aligned bolt holes in these brackets, are avoided.

Figure 2:
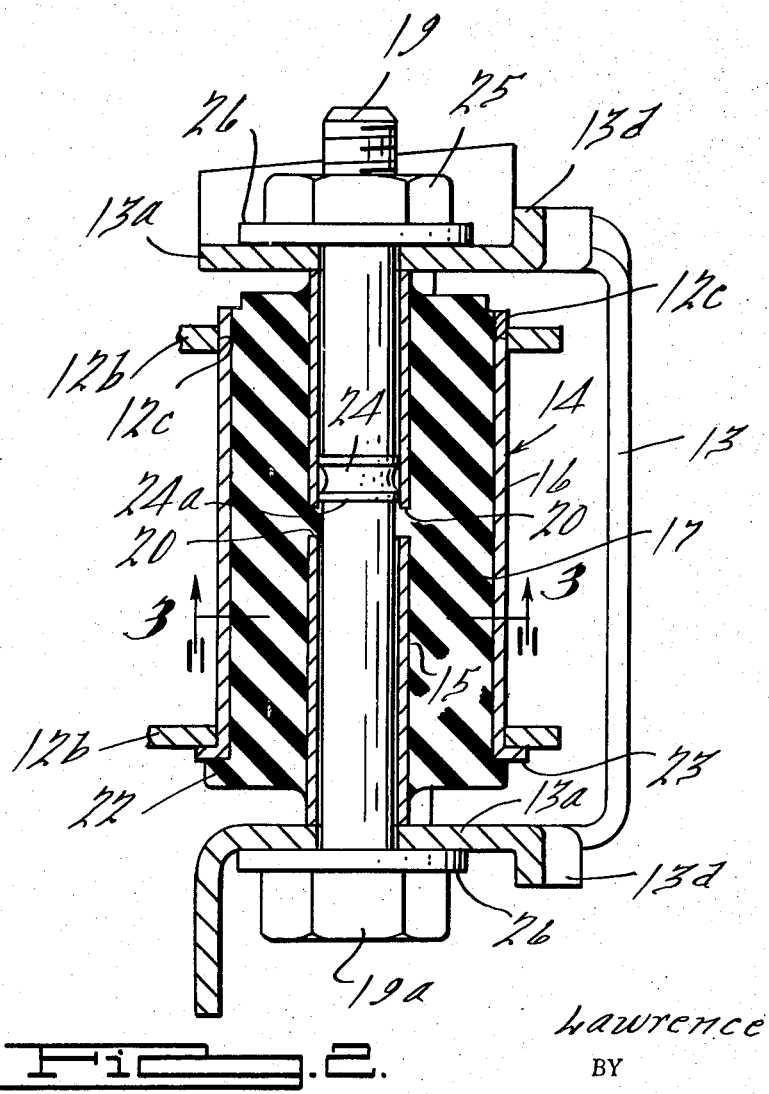
FIG. 2 is an enlarged longitudinal sectional view taken in the direction of the arrows substantially along the line 2—2 of FIG. 1.

As indicated in FIGS. 2 and 4, at the clamping position the washers 26 will closely underlie the flanges 13d to prevent upward movement of the bushing assembly 14. The lower portions of the slots 13b adjacent their bases conform closely to the associated bolt 19 to prevent its lateral displacement. Also each inner tubular member 15 extends axially beyond the associated outer tubular member 16 and is thus engaged by the channel arms 13a. In consequence the engine 10 is resiliently supported by the elastic bushing 17 for limited cushioned movement in any direction, whether linear, pivotal, or a combination of such movements. In the event of engine roll, the void 21 edgewise of the flat 18 extending in the direction of the roll will be partially closed as the elastic material of the bushing 17 yields to accommodate the roll. After approximately 2½° of roll, further engine roll will be prevented by bottoming of the latter flat against the adjacent portions of the bushing 17 along the large diameter of the oval outer housing member 16.

Engine vibration damping is determined by the relationship of the voids 21 with respect to the solid compressed portion of the bushing 17 along the diameter transverse to the voids 21. It is accordingly apparent that merely by rotating the alignment of the oval holes 12c in the channel sides 12b, the mounting may be readily modified to accommodate minor modifications of the engine or body structure without changing the structure of the bushing assembly 14 or appreciably modifying the mounting brackets 12 and 13. Likewise the same bushing assembly 14 may be employed with different optional engines in the same vehicle body.

I claim:

1. In a vibration damping means for mounting an automobile engine on a body member, A. a bushing assembly comprising inner and outer tubular members of rigid load sustaining material spaced radially by an intermediate elastic bushing under pressure and bonded to said members,
   1. said inner tubular member having a radial opening in its sidewall, and
   2. said elastic bushing having an elastic detent portion extruding radially through said opening into said inner tubular member,
B. means for securing said outer tubular member in predetermined fixed relationship on said engine,
C. a bolt insertable axially through the opening of said inner tubular member and having an annular groove recessed into its periphery to receive said detent portion in detent relationship when said bolt is inserted axially into said inner tubular member to a predetermined detent position,
D. bracket means of rigid load sustaining material comprising a pair of bracket elements normally spaced axially of said bushing assembly to receive the same freely therebetween and being yieldable for clamping said bushing assembly therebetween,
E. a pair of bolt locating slots in said bracket elements respectively,
F. each slot opening upwardly from a bolt supporting base and being aligned with the other slot to receive the opposite ends of said bolt extending axially through said inner tubular member,
G. means for securing said bracket means in predetermined fixed relationship on said body member,
H. screw threaded clamping means for urging said bracket elements toward each other to clamp said bushing assembly therebetween, including
   a. said bolt as a part thereof dimensioned to extend axially through said slots for confinement therein in supported relationship on the bases thereof when said bolt is inserted into said inner tubular member to said predetermined detent position,
   b. enlarged clamping members on said bolt axially outwardly of said bracket elements, said clamping members
      1. being oversize with respect to said slots to prevent passage therethrough and
      2. being adjustable with respect to each other on said bolt to clamp said bracket elements therebetween tightly against said bushing assembly.

2. In the combination according to claim 1, said inner tubular member extending axially endwise in opposite directions beyond said outer tubular member, and said bracket elements being engageable with the axially opposite ends of said inner tubular member to clamp the same axially therebetween to comprise the sole means for clamping said bushing assembly upon tightening of said clamping means.

3. In the combination according to claim 1, said outer tubular member being out-of-round in cross section transverse to the axis of the opening therethrough, and said means for securing said outer tubular member on said engine comprising a channel bracket attachable to said engine and having spaced channel sides containing aligned out-of-round holes dimensioned to receive and conform closely to the axially opposite ends of said out-of-round outer tubular member with an interference fit.

4. In the combination according to claim 1, said bracket elements having axially outwardly directed flanges closely overlying said enlarged clamping members when the latter are clamped tightly against said bracket elements, thereby to limit upward movement of said clamping means within said slots.

5. In the combination according to claim 4, said clamping members being adjustable relative to each other on said bolt axially outwardly of said flanges when said bolt is inserted axially into said inner tubular member to said detent position, thereby to facilitate assembly of said bushing assembly with said bracket means prior to tightening of said clamping means.

6. In combination, a bushing assembly comprising inner and outer hollow members spaced by an elastic bushing under pressure between said members, a bolt insertable axially into said inner hollow member to a predetermined detent position with the opposite ends of said bolt extending axially from said inner member, detent means on said bolt and bushing assembly for releasably retaining said bolt at said position, a pair of slotted brackets spaced axially of said bolt to receive said bushing assembly therebetween with said bolt extending axially through said hollow member and with said opposite bolt ends extending axially through the slots in said brackets respectively, and clamping members oversize with respect to said slots to prevent axial passage therethrough adjustable axially with respect to each other on said bolt ends at locations axially outwardly of said slots to clamp said brackets axially inwardly against said bushing assembly.

7. In the combination according to claim 6, said slots opening at one end of each bracket to receive said bolt ends with said clamping members thereon axially outwardly of said slots and terminating at their other ends at bolt locating seats for supporting said bolt ends.

8. In the combination according to claim 7, said brackets having axially outwardly extending flanges spaced from said bolt locating seats to overlie said clamping members and limit movement thereof and said bolt ends from said seats by engagement with said clamping members when the latter are adjusted to clamp said bushing assembly axially between said brackets, said clamping members being adjustable to position outwardly of said flanges when said bolt is inserted to said detent position within said inner member, thereby to freely clear said flanges when said bolt ends are inserted into said one end of each slot.

9. In the combination according to claim 8, said clamping members comprising a bolt head at one end of said bolt and a nut screwed on the other end.

10. In the combination according to claim 6, said clamping members comprising a bolt head at one end of said bolt and a nut screwed on the other end.

11. In the combination according to claim 6, said detent means comprising an annular detent receiving recess in the periphery of said bolt, and an elastic detent portion of said bushing extending radially through an opening in the sidewall of said inner bushing member into said recess in detent engagement with the sides of the latter at said detent position and being deformable out of said detent engagement upon forceful axial movement of said bolt from said detent position.

* * * * *